United States Patent [19]
Moore

[11] 3,958,663
[45] May 25, 1976

[54] AIR LINE LUBRICATOR SAFETY DEVICE

[76] Inventor: Robert M. Moore, 4695 S. Jason St., Englewood, Colo. 80110

[22] Filed: Jan. 15, 1975

[21] Appl. No.: 541,200

[52] U.S. Cl. .............................. 184/6.4; 184/1 C; 184/103 A; 184/55 A; 184/6.14
[51] Int. Cl.² ........................................ F16N 7/30
[58] Field of Search ............... 184/6.4, 6.1, 55 A, 184/103 A, 1 C, 56 A

[56] References Cited
UNITED STATES PATENTS

| | | | |
|---|---|---|---|
| 2,615,419 | 10/1952 | Topping | 184/1 C |
| 2,886,056 | 5/1959 | Ratliff | 184/103 A |
| 2,966,295 | 12/1960 | Rayfield | 184/103 A |
| 3,015,371 | 1/1962 | Gits | 184/103 A |
| 3,447,562 | 6/1969 | Hoffman | 184/103 A |
| 3,590,955 | 7/1971 | Rau | 184/103 A |
| 3,805,922 | 4/1974 | Moore | 184/103 A |

*Primary Examiner*—Richard C. Pinkham
*Assistant Examiner*—Marvin Siskind
*Attorney, Agent, or Firm*—Bertha L. MacGregor

[57] ABSTRACT

Disclosed herein is an air line lubricator safety device for automatically actuating an air actuatable member located outside of the lubricator. The air actuatable member may be a normally open air valve in an air line leading to an air operated tool, said air valve being automatically closed when the oil level in the lubricator falls below a predetermined level and thereby prevents operation of the tool; or the air actuatable member may be a signal device such as a whistle or light or other signal automatically air actuated when the oil level in the lubricator falls below a predetermined level. The safety device comprises a lubricator having an oil bowl containing oil and air under pressure, the bowl having a head provided with a piston chamber, a float-controlled piston slidable in the chamber, an air intake passage in the head communicating with the pressurized area region of the bowl and with the piston chamber, and an air oulet tube leading from the piston chamber; said piston moving downwardly in the chamber when the oil supply falls below a predetermined level, thereby permitting pressurized air to flow through the air outlet tube for actuating one of the air actuatable members located outside of the lubricator.

7 Claims, 3 Drawing Figures

AIR LINE LUBRICATOR SAFETY DEVICE

This invention relates to a safety device for air line lubricators designed for tool maintenance. The safety device may be designed to prevent operation of the air operated tool when the oil supply in the lubricator falls below a predetermined level by utilizing pressurized air from the lubricator for closing a valve and automatically cutting off the pressurized air supply to the tool to thus prevent operation of and injury to the tool. The safety device may also be used to employ air released from the lubricator bowl when the oil supply in the lubricator falls below a predetermined level for the purpose of actuating signal devices that warn the operator that the lubricator bowl is low on lubricant. The signal devices may be of various kinds, such as a pressure operated electric switch which sounds an alarm or causes a signal light to be energized; or may cause a whistle to blow, or to actuate an arm to serve as a warning signal.

Two embodiments of a safety device for air line lubricators designed for tool maintenance have been disclosed in my U.S. Pat. No. 3,805,922. Also disclosed in said patent are the means for automatically cutting off the pressurized air supply to the air operated tool when the oil supply in the lubricator falls below a predetermined level, and the several types of signal means that warn the operator that the lubricator oil needs replenishment.

The main object of this invention is to provide a safety device which is a simplified modification of the device disclosed in the aforesaid patent, for automatically preventing operation of an air operated tool when the oil supply is exhausted or nearly exhausted by automatically closing a normally open air valve in the air line that supplies pressurized air to to tool, or which automatically actuates a warning signal that informs the operator that the lubricator bowl is low on lubricant.

Another object is to provide a float actuated piston which controls the passage of pressurized air from the lubricator bowl to the air actuatable devices aforesaid. The construction is not only simple and compact, but readily installable in existing lubricators or built into newly manufactured lubricators.

Figure 1:
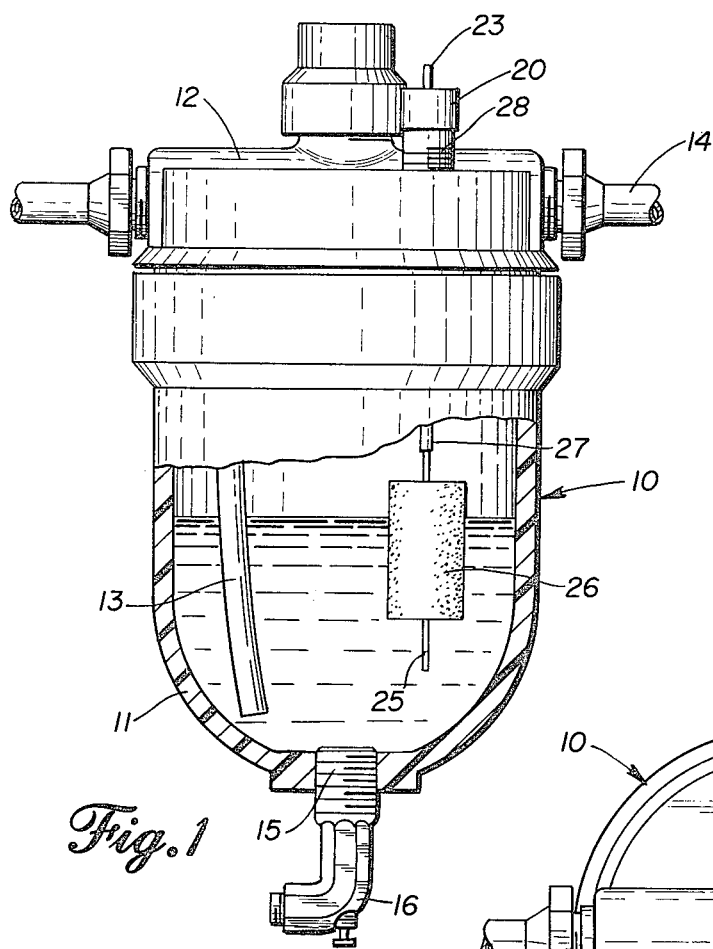
FIG. 1 is an elevational side view, partly in section, of an air line lubricator safety device embodying the invention.
Figure 2:
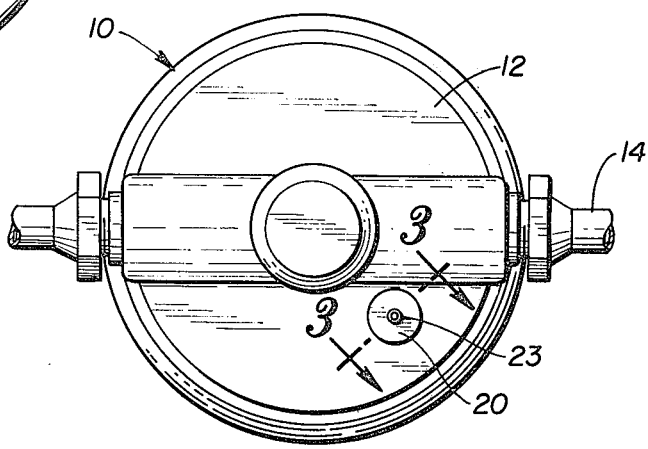
FIG. 2 is a top plan view of the device of FIG. 1.
Figure 3:
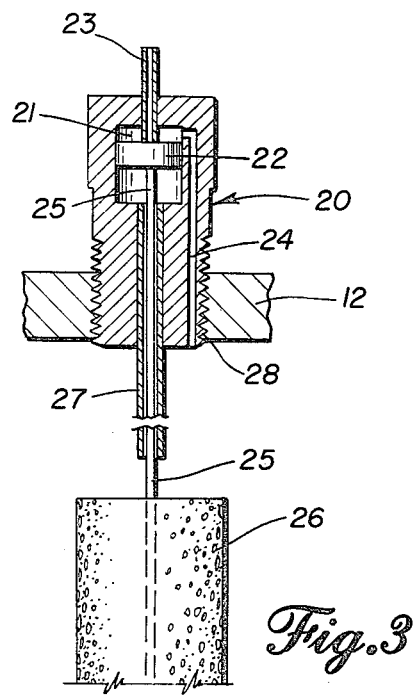
FIG. 3 is a vertical sectional view in the plane of the line 3—3 of FIG. 2, showing the float in the raised postion normal when oil supply is above a predetermined level wherein the piston closes the air outlet tube of the safety device.

In the embodiment of the invention shown in the drawing, the lubricator 10 comprises an oil holding bowl 11, head 12, oil feeder tube 13 which feeds oil to an air line 14 extending outwardly from the head 12. The lower end of the bowl is closed by a plug 15 and has a drain core 16. This is prior art conventional construction.

One embodiment of the safety device of this invention comprises a cylindrical housing 20 which contains a piston chamber 21 in which a piston 22 is slidably mounted. The housing 20 has mounted therein an air outlet tube 23 which extends from the chamber 21 above the piston to an air actuatable device (not shown) such as the valve or warning signal means, heretofore described and shown in my aforesaid patent, located outside of the lubricator. The housing 20 also has formed therein an inverted L-shaped air inlet passage 24 which communicates with the upper pressurized air region of the lubricator bowl 11, above the oil supply, to convey pressurized air from the bowl 11 to the piston chamber 21 in the housing 20. A stiff wire 25 is connected at one of its ends to the lower surface of the piston 22 and at its other lower end to a float 26. A guide tube 27 is mounted at its upper end in the lower portion of the housing 20. The wire 25 extends through the tube 27 between the float and the piston.

The housing 20 is easily installed in the head 12 of the lubricator by means of the threads 28 on the lower circumferential edge of the housing designed to engage threads of an opening drilled in the head of the lubricator or provided in the manufacturing of the lubricator.

Instead of using a housing 20 installed in existing or newly manufactured lubricators by drilling a hole in the head 12, the safety device parts may be built directly in the head of the lubricator by forming the piston chamber 21 in the head and locating the air passageway 24 and air outlet tube 23 directly in the head 12 in communication with the piston chamber 21, for the same purpose described heretofore.

The operation of the safety device is as follows: When the oil supply in the bowl 11 falls below a predetermined level, the float 26 moves downwardly automatically and causes the wire 25 to pull downwardly on the piston 22 which slides in the chamber 21 allowing pressurized air from the bowl 11 to pass into the air outlet tube 23. The passageway 24 is not sealed by the piston 22 in its raised position. Said passageway 24 serves to convey air under pressure to the piston chamber 21 and thence to the signalling devices through the air outlet tube 23 when the piston drops away from the said tube 23. The piston 22 would be difficult to pull down by the float if the air passage 24 were not provided for allowing some of the pressurized air from the bowl 11 to pass into that part of the piston chamber 21 above the piston 22. As previously explained, said outlet tube 23 is connected to the previously mentioned valve (not shown) which may cut off air to an air operated tool or to one of the several kinds of warning signals (not shown) disclosed in my aforesaid patent.

As soon as the oil supply has been replenished, the float 26 and wire 25 cause the piston 22 to slide upwardly into position closing the air outlet tube 23 and thus prevents air from passing out of the outlet tube 23.

I claim:

1. An air line lubricator safety device for automatically actuating an air actuatable member such as a tool cut-off valve or a signaling device located outside of the lubricator comprising
   a. a lubricator having a head which includes means for feeding pressurized air into the lubricator, said lubricator having an oil bowl containing oil and pressurized air and means for feeding the oil to a line leading to an air operated tool,
   b. a piston housing having a piston chamber mounted on the head of the lubricator,
   c. a piston slidable in said piston chamber,
   d. an air outlet tube communicating with said piston chamber and leading to an air actuatable member located outside of the lubricator, e. a float supported by the oil in the lubricator bowl to rise and fall with the level of said oil, f. means connecting the float to the piston to cause the piston to move to a position closing said air outlet tube when the oil supports the float above a predetermined level and to expose the opening in said air outlet tube when the oil supports the float below a predetermined level, and g. an air intake passageway in the piston housing communicating with the pressurized air in the lubricator bowl and with the piston chamber and delivering pressurized air to the piston chamber between the face of the piston and end of the piston chamber in communication with the air outlet tube, thereby permitting pressurized air to flow through the air outlet tube for actuating an actuable member located outside of the lubricator.

2. The device defined by claim 1, in which the piston housing is a cylinder and the piston is connected to the float through the cylinder bottom.

3. The device defined by claim 2, in which the lubricator housing is provided with a threaded opening in its head and the piston housing is threaded for mounting it in said opening in the lubricator head.

4. The device defined by claim 1, in which the means connecting the float to the piston is a stiff wire which transmits float movement to the piston.

5. The device defined by claim 1, in which the air intake passageway is an inverted "L" form, located in the piston housing side wall.

6. The device defined by claim 1, in which the air outlet tube is a straight tube which extends through the top of the cylindrical piston housing.

7. The device defined by claim 1, which includes a length of tubing mounted in the piston housing and surrounding the connecting means between the piston and float for guiding the said connecting means when the float moves under influence of changing oil levels.

* * * * *